Patented Feb. 27, 1923.

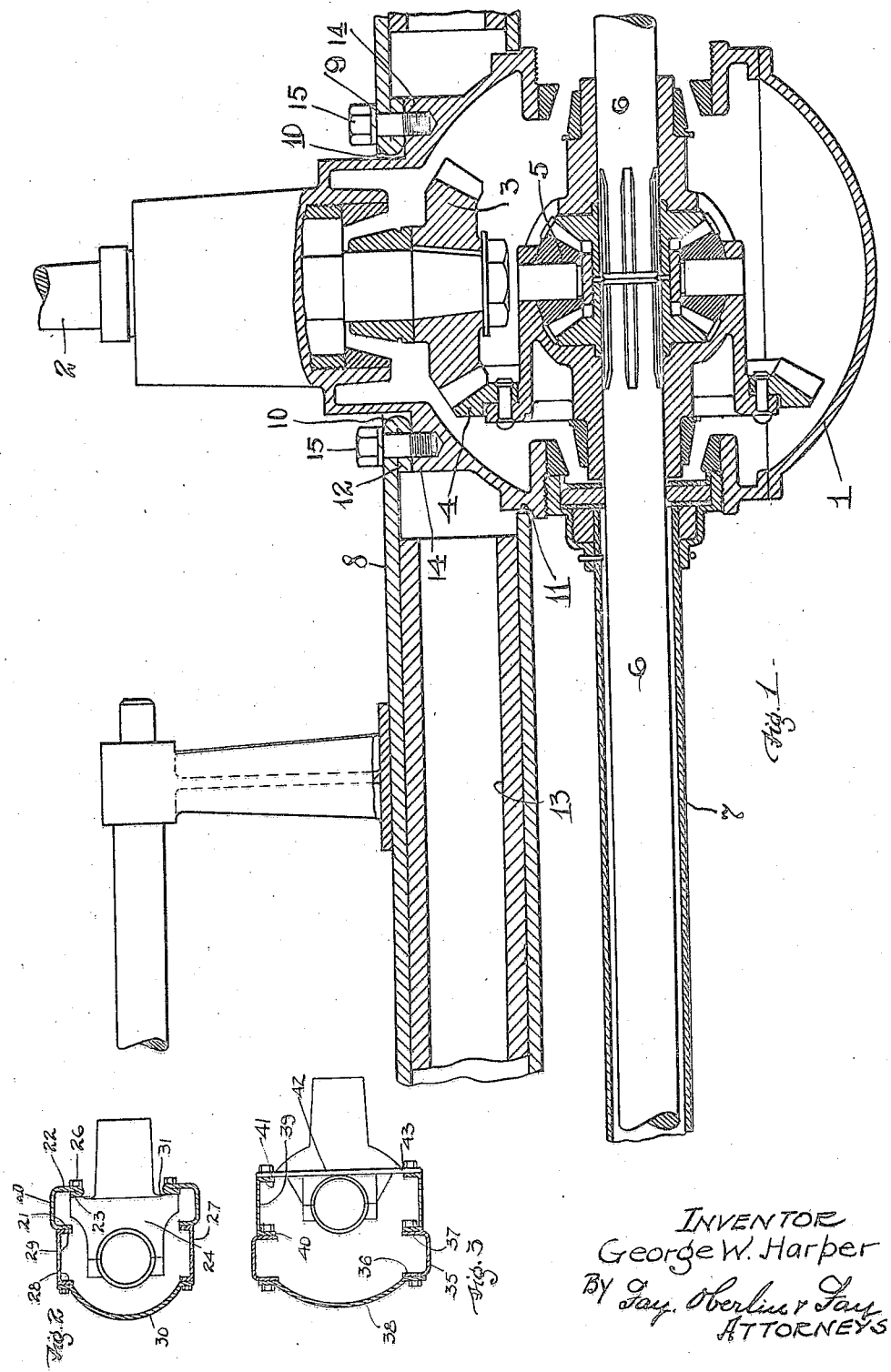

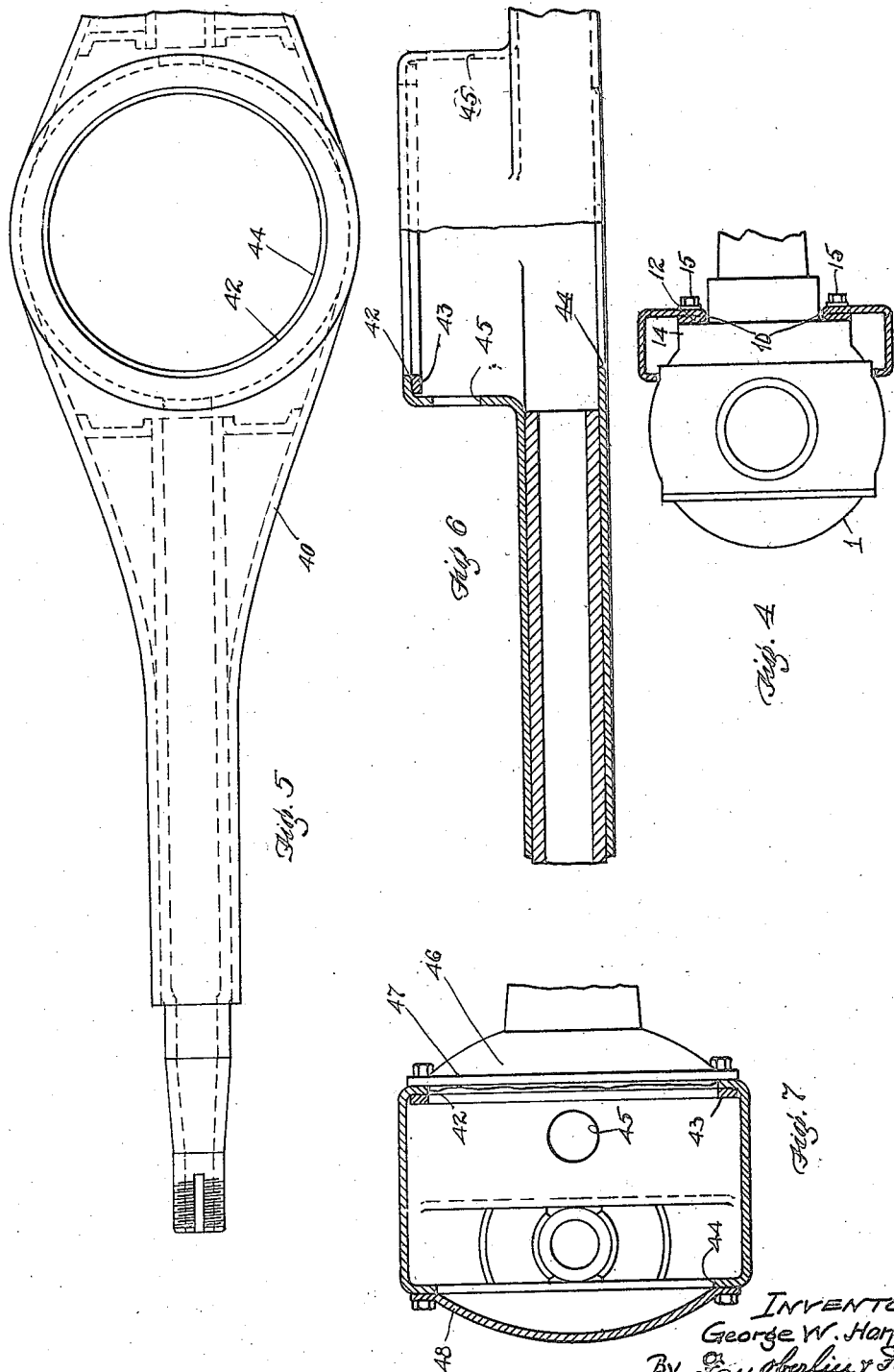

1,446,502

UNITED STATES PATENT OFFICE.

GEORGE W. HARPER, OF CLEVELAND, OHIO, ASSIGNOR TO THE COLUMBIA AXLE COMPANY, OF CLEVELAND, OHIO, A CORPORATION OF OHIO.

AXLE CONSTRUCTION.

Application filed June 14, 1918. Serial No. 239,916.

*To all whom it may concern:*

Be it known that I, GEORGE W. HARPER, a citizen of the United States, and a resident of Cleveland, county of Cuyahoga, and State of Ohio, have invented a new and useful Improvement in Axle Constructions, of which the following is a specification, the principle of the invention being herein explained and the best mode in which I have contemplated applying that principle, so as to distinguish it from other inventions.

The present invention, relating, as indicated, to axle construction, is particularly concerned with an axle of the type commonly known as an internal gear drive axle, in which the load is supported upon one member designed particularly for that purpose, and the drive is communicated to the wheels through other members supported upon the load-carrying member. One object of the present invention is the provision in an axle of this type of an extremely simple and strong load-carrying member, to which the driving members may be readily attached. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:—

Fig. 1 is a section taken on a horizontal plane through one form of my improved axle showing the improved features of the construction; Fig. 2 is a central vertical section showing a modified type of axle; Fig. 3 is a similar view showing still another form; Fig. 4 is a transverse central vertical section similar to Figs. 2 and 3, but showing the axle of Fig. 1; Fig. 5 is a front elevation of a modified type of axle housing which may be employed; Fig. 6 is a plan view of the same, part being shown in horizontal longitudinal section; and Fig. 7 is a central transverse vertical section of the housing in Figs. 5 and 6, to which are attached a differential carrier and a rear cover plate.

In Fig. 1 there is shown a casing 1, in which there is mounted differential mechanism of the usual type in which the drive is communicated through the driving shaft 2 to bevel gears 3 and 4, and then through the differential mechanism 5 to the driving shaft 6. The casing 1 is extended forwardly to provide a suitable bearing for the driving shaft 2 and the various elements of the differential mechanism are supported in the usual manner, and need not be explained in detail.

In front of and parallel to the driving axle 6, the two shafts of which are mounted in tubular casings 7 attached to the differential casing 1, is a load-carrying axle in the form of a tubular housing 8 provided with an enlarged central portion 9, in which there are formed aligned co-axial openings 10 and 11. The opening 10 in the front or forward face of the housing 8 is of less diameter than the opening 11 in the rear face and is reinforced by having an inwardly turned flange 12, forced into contact with the inner side of the housing proper. In this way there is formed an edge portion about the front opening of double thickness and of considerable strength. Mounted in the housing 8 are re-inforcing tubes 13 for the purpose of strengthening the axle, and it will be understood that the ends of the tubes 13 are formed into wheel spindles for receiving the wheels. Any desired construction of driving mechanism may be employed for communicating the drive from the shafts 6 to the wheels, and as an internal gear drive, such as has been briefly described above, is not in itself new, I have neither shown nor described the wheel mechanism.

The differential casing 1 is provided on its front side with an extending face or projection 14, which is adapted to contact against the inner face of the inturned flange 12. The differential casing is placed in position in the housing by being moved into the same through the rear opening 11 until the face 14 is in engagement with the flange 12, and is maintained in such position by a plurality of bolts 15 which pass through the housing and are threaded into the face 14 on the casing. The enlarged portion of the housing, which will ordinarily be disposed centrally of the axle, is of the same width, measured on a horizontal plane as the remainder of the axle 8, but is enlarged sufficiently to permit of the convenient introduction thereinto of the forward part of the differential casing 1. The casing 1 is so constructed that it will not contact the edges of the opening 11 in the rear face of the housing, as this has been found unnecessary since the engagement by means of the bolts 15 has been found entirely sufficient to rigidly secure the differential casing and attendant parts to the tubular housing which constitutes the load-carrying axle.

In Fig. 2 I have shown a modification of my improved type of internal gear drive axle, in which there is shown a tubular housing 20 having an enlarged central portion as before and provided with inwardly extending substantially parallel flanges 21 and 22. The flange 22, which is the front flange or side of the housing, is bent inwardly upon itself as at 23 to provide a reinforced edge, to which may be fastened a differential carrier 24 carrying the usual differential mechanism and bearings for a propeller shaft (not shown). The differential carrier 24 is constructed to be passed from behind through the opening in the flange or side 21 of the tubular housing and into engagement with the inner face of the front side or flange 22 of the housing, to which it is securely bolted by bolts 26. The differential carrier extends rearwardly through the opening in the flange 21 bringing axle shafts which may be fitted into the differential carrier outside of and behind the tubular housing 20. In order to enclose the differential carrier I mount against the outer face of the rear side or flange 21 of the housing, a cylindrical spacer plate or shell 27, having open ends and inwardly turned flanges 28 and 29, the latter of which abuts against the flange 21 and is fastened thereto in any suitable manner.

Into this shell 27 may be fitted the usual shaft enclosing sleeves, which are common in this type of axles, but as these sleeves are extremely light there is practically no weight to be carried by this shell, except the weight of a cover plate 30 mounted against the flange 28 and covering the rear opening in the shell. The tubular housing 20, the front plate 31 of the differential carrier, the shell 27 and the rear cover plate 30 jointly form an enclosing casing for the differential mechanism, but the load is entirely supported from the tubular housing 20, as is apparent from the foregoing description of the functions of the various parts. Since no load, except possibly that of the sleeves surrounding the axles, is to be carried by the shell 27, it may be made of extremely light construction. By the removal of the cover plate 30 access may be had to the interior of this composite differential enclosing casing, while the entire differential may be removed through the rear opening in the shell 27 upon the removal of the cover plate 30, and upon disengagement of the bolts 26.

In Fig. 3 I have shown still another modified form of my improved axle, in which a tubular housing 35 serves to support the load, this housing having an enlarged and apertured central portion, as in the previous figures, it being provided with inwardly directed opposite flanges 36 and 37. The opening in the rear flange 36 is covered by means of a removable cover plate 38. In this axle the differential mechanism and the axle shafts are mounted ahead of the load-supporting axle 35, and since this mechanism must be supported from the axle 35 and must be sufficiently ahead of the same to permit of the mounting of the axle shafts I provide a strong open-ended cylindrical shell 39 having inwardly directed flanges 40 and 41, the first of which abuts against the front flange 37 of the housing 35 and is removably bolted thereto. The differential carrier 42 is provided with a transversely extending plate 43 of the same size as the shell 39, and this plate is removably bolted against the front flange 41 of this shell. This plate 43, the shell 39, the housing 35 and the rear cover plate 38 constitute jointly an enclosed casing for the differential mechanism, access to which may be had by the removal of the cover plate 38, while the differential mechanism may be entirely removed from the casing by the removal of the bolts which fasten same to the shell 39. In this construction the shell 39 performs an entirely different function from that of the shell 27 in the preceding construction, as the shell 39 must be of considerable strength and must act as an extension of the housing 35 and must be of sufficient rigidity to securely support the differential mechanism in a fixed position with respect to the housing.

An important advantage of my improved axle is that it makes possible the use of a tubular housing which is of much greater strength than the I-beam which has commonly been used as a load-carrying member in internal drive axles. An I-beam is constructed primarily for strength in but one plane, while a tubular housing has the same strength in every plane and, compared to an I-beam, is thus several times stronger against torsional or horizontal strains than the I-beam and can be made equally strong against vertical strains.

In Figs. 5, 6 and 7 there is shown an axle housing 40, which is formed with a pressed out central portion 41 in the form of a cylinder, which portion serves the same purpose as the intermediate member 27 in Fig. 2, or 39 in Fig. 3. This extension or pressed-out portion 41 serves to receive the rear cover plate or the differential carrier. The housing of Figs. 5, 6 and 7 is formed by first pressing a cylindrical extension 41 from a flat sheet or blank and then punching therein the opening 42, which serves as a front opening of the final housing, and which is reinforced by means of an inserted plate 43, welded, or otherwise securely attached thereto. The blank, after this operation, is then folded, first into a U-shaped section and then into final cylindrical sections or edges welded, or otherwise securely fastened together and with an opening 44 in its rear face corresponding in position and in location to the opening 42 in the front face. Lateral openings 45 are also formed in the opposite sides of the extension 41 for the insertion of the axle-receiving tubes 7, which are included as one part of such an axle, and a differential carrier 46, provided with a lateral extending plate or flange 47, is securely bolted to the reinforced edges of the hole 42, while the differential carrier proper extends into the extension 41 and the body of the housing adjoining same. The rear opening 44 of the housing may be closed by means of a removable cover plate 48 corresponding to the plates 30 and 38 in Figs. 2 and 3 respectively.

The construction illustrated in Figs. 5, 6 and 7 briefly described above is of particular advantage and importance as it comprises an integral one-piece member for carrying and enclosing the differential carrier when used, of course, with a suitable rear cover plate, such as described.

Other modes of applying the principle of my invention may be employed instead of the one explained, change being made, as regards the mechanism herein disclosed, provided the means stated by any of the following claims or the equivalent of such stated means be employed.

I therefore particularly point out and distinctly claim as my invention:—

1. In an axle of the type described, the combination of a tubular axle housing provided with an enlarged portion having openings in opposite sides thereof, an open ended cylindrical shell mounted against the front face of such enlarged portion of said housing about the opening therein, said shell forming an extension of said housing, and a differential carrier mounted on said shell.

2. In an axle of the type described, the combination of a tubular axle housing provided with an enlarged portion having openings in opposite sides thereof, an open ended shell mounted against the front face of such enlarged portion of said housing about the opening therein, and a differential carrier mounted on said shell, said shell being adapted to rigidly support said carrier from said housing.

3. In an axle of the type described, the combination of a tubular axle housing provided with an enlarged portion having openings in opposite sides thereof, an open ended shell mounted against the front face of such enlarged portion of said housing about the opening therein, a combined differential carrier and cover plate mounted against and closing the front face of said shell, and a cover plate mounted against the rear face of such enlarged portion of said housing about the opening therein.

Signed by me, this 3rd day of June, 1918.

GEORGE W. HARPER.